United States Patent
Chandramouli et al.

(10) Patent No.: US 11,438,738 B2
(45) Date of Patent: Sep. 6, 2022

(54) SMS VIA NAS CARRIED BY NON-CELLULAR ACCESS

(71) Applicant: Nokia Technologies Oy, Espoo (FI)

(72) Inventors: Devaki Chandramouli, Plano, TX (US); Curt Wong, Bellevue, WA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/609,435

(22) PCT Filed: May 8, 2017

(86) PCT No.: PCT/US2017/031618
§ 371 (c)(1),
(2) Date: Oct. 29, 2019

(87) PCT Pub. No.: WO2018/208283
PCT Pub. Date: Nov. 15, 2018

(65) Prior Publication Data
US 2020/0196112 A1    Jun. 18, 2020

(51) Int. Cl.
*H04W 4/14*    (2009.01)
*H04W 84/12*    (2009.01)

(52) U.S. Cl.
CPC ............. *H04W 4/14* (2013.01); *H04W 84/12* (2013.01)

(58) Field of Classification Search
CPC ..... H04W 48/16; H04W 88/18; H04W 80/04; H04W 92/14; H04W 4/70; H04W 72/10;
(Continued)

(56) References Cited

U.S. PATENT DOCUMENTS

| | | | |
|---|---|---|---|
| 6,122,503 A * | 9/2000 | Daly | H04W 48/16 455/433 |
| 6,456,843 B1 * | 9/2002 | Daly | H04W 48/16 455/466 |

(Continued)

FOREIGN PATENT DOCUMENTS

| | | | | |
|---|---|---|---|---|
| WO | WO2018065060 A1 * | 4/2018 | | |
| WO | WO-2018174516 A1 * | 9/2018 | ............ | H04W 28/04 |
| WO | WO-2020036466 A1 * | 2/2020 | ............ | H04W 60/00 |

OTHER PUBLICATIONS

Survey on Threats and Attacks on Mobile Networks by Silvere Mavoungou; Georges Kaddoum; Mostafa Taha; Georges Matar Published in: IEEE Access (vol. 4) Aug. 2016 (Year: 2016).*

(Continued)

*Primary Examiner* — William D Cumming
(74) *Attorney, Agent, or Firm* — Squire Patton Boggs (US) LLP

(57) ABSTRACT

Methods and apparatus, including computer program products, are provided for services, such as SMS, location services, and/or the like over the NAS through a non-cellular access. In some example embodiments, there may be provided a method that includes receiving, via a non-access stratum connection through a wireless local area network, a notification message; sending a service request message to request, via the non-access stratum connection through the wireless local area network, delivery of downlink data for a service; and receiving, via the non-access stratum connection through the wireless local area network, the downlink data for the service. Related systems, methods, and articles of manufacture are also described.

20 Claims, 5 Drawing Sheets

(58) Field of Classification Search

CPC ..... H04W 76/27; H04W 60/04; H04W 60/00; H04W 72/04; H04W 28/16; H04W 72/048; H04W 36/0011; H04W 36/165; H04W 80/10; H04W 36/0022; H04W 8/02; H04W 36/14; H04W 76/36; H04W 8/245; H04W 68/005; H04W 36/0072; H04W 76/38; H04W 72/042; H04W 12/08; H04W 4/15; H04W 4/14; H04W 4/50; H04W 36/34; H04W 28/08; H04W 28/04

USPC ........ 455/418, 419, 406, 433, 466; 370/235, 370/331, 328, 329

See application file for complete search history.

(56) References Cited

U.S. PATENT DOCUMENTS

| Patent/Pub No. | Type | Date | Name | Class |
|---|---|---|---|---|
| 7,136,633 | B2* | 11/2006 | Daly | H04W 48/16 455/433 |
| 8,774,818 | B2* | 7/2014 | Lim | H04W 12/08 370/328 |
| 9,247,471 | B2* | 1/2016 | Velev | H04W 68/005 |
| 9,516,567 | B2 | 12/2016 | Faccin et al. | |
| 9,820,187 | B2* | 11/2017 | Sirotkin | H04W 36/14 |
| 9,894,579 | B2* | 2/2018 | Velev | H04W 36/165 |
| 9,924,430 | B2* | 3/2018 | Liang | H04W 36/0072 |
| 10,142,994 | B2* | 11/2018 | Lee | H04W 28/16 |
| 10,375,535 | B2* | 8/2019 | Hua | H04W 88/18 |
| 10,412,741 | B2* | 9/2019 | Lee | H04W 72/048 |
| 10,477,445 | B2* | 11/2019 | Velev | H04W 76/36 |
| 10,602,415 | B2* | 3/2020 | Bae | H04W 36/16 |
| 11,166,337 | B2* | 11/2021 | Liu | H04W 68/005 |
| 2002/0193103 | A1* | 12/2002 | Daly | H04W 8/245 455/406 |
| 2012/0276913 | A1* | 11/2012 | Lim | H04W 76/10 455/450 |
| 2014/0016614 | A1* | 1/2014 | Velev | H04W 4/14 370/331 |
| 2015/0358876 | A1* | 12/2015 | Liang | H04W 36/14 370/331 |
| 2015/0358954 | A1* | 12/2015 | Koshimizu | H04W 4/70 370/329 |
| 2016/0021570 | A1* | 1/2016 | Sirotkin | H04W 28/08 370/235 |
| 2016/0127968 | A1* | 5/2016 | Velev | H04W 4/50 370/331 |
| 2016/0205150 | A1 | 7/2016 | Shaheen et al. | |
| 2016/0255544 | A1 | 9/2016 | Watfa et al. | |
| 2017/0048684 | A1 | 2/2017 | Rönneke et al. | |
| 2017/0251516 | A1* | 8/2017 | Bangolae | H04W 76/27 |
| 2017/0303259 | A1* | 10/2017 | Lee | H04W 28/16 |
| 2018/0139671 | A1* | 5/2018 | Velev | H04W 76/27 |
| 2018/0270712 | A1* | 9/2018 | Faccin | H04W 72/10 |
| 2018/0270896 | A1* | 9/2018 | Faccin | H04W 76/10 |
| 2018/0324577 | A1* | 11/2018 | Faccin | H04W 48/18 |
| 2018/0368202 | A1* | 12/2018 | Landais | H04W 48/12 |
| 2018/0376297 | A1* | 12/2018 | Hua | H04W 76/19 |
| 2019/0053117 | A1* | 2/2019 | Bae | H04W 36/0011 |
| 2019/0098618 | A1* | 3/2019 | Lee | H04W 12/08 |
| 2019/0104134 | A1* | 4/2019 | Lee | H04L 63/062 |
| 2019/0116631 | A1* | 4/2019 | Talebi Fard | H04W 76/11 |
| 2019/0174449 | A1* | 6/2019 | Shan | H04W 60/00 |
| 2019/0190635 | A1* | 6/2019 | Goel | H04J 3/0644 |
| 2019/0268276 | A1* | 8/2019 | Lee | H04L 47/36 |
| 2019/0313217 | A1* | 10/2019 | Hua | H04W 92/14 |
| 2019/0342851 | A1* | 11/2019 | Shan | H04W 60/04 |
| 2019/0357037 | A1* | 11/2019 | Velev | H04W 36/0022 |
| 2020/0008184 | A1* | 1/2020 | Lee | H04W 72/048 |
| 2020/0037220 | A1* | 1/2020 | Velev | H04W 68/005 |
| 2020/0100319 | A1* | 3/2020 | Talebi Fard | H04W 76/32 |
| 2020/0196112 | A1* | 6/2020 | Chandramouli | H04W 4/14 |
| 2020/0323020 | A1* | 10/2020 | Liu | H04L 69/322 |
| 2021/0243648 | A1* | 8/2021 | Liu | H04W 28/06 |
| 2022/0022278 | A1* | 1/2022 | Liu | H04W 80/10 |

OTHER PUBLICATIONS

M. Wetterwald, T. Buburuzan and G. Carneiro, "Combining MBMS and IEEE 802.21 for on-the-road emergency," 2008 8th International Conference on ITS Telecommunications, Oct. 2008, pp. 434-438, doi: 10.1109/ITST.2008.4740301. (Year: 2008).*

S. Mavoungou, G. Kaddoum, M. Taha and G. Matar, "Survey on Threats and Attacks on Mobile Networks," in IEEE Access, vol. 4, pp. 4543-4572, Aug. 2016, doi: 10.1109/ACCESS.2016.2601009. (Year: 2016).*

"3rd Generation Partnership Project; Technical Specification Group Services and System Aspects; Procedures for the 5G System; Stage 2 (Release 15)", 3GPP TS 23.502, V0.2.0, Feb. 2017, pp. 1-71.

"3rd Generation Partnership Project; Technical Specification Group Services and System Aspects; Architectural requirements (Release 14)", 3GPP TS 23.221, V14.1.0, Dec. 2016, pp. 1-52.

"23.501: Corrections in the AMF procedures for Non-3GPP", SA WG2 Meeting #120, S2-172717, Agenda : 6.5.2, Nokia, Mar. 27-31, 2017, pp. 1-4.

"TS 23.502: Procedures for use of NAS Transport", SA WG2 Meeting #120, S2-171720, Agenda : 6.5.1, Qualcomm Incorporated, Mar. 27-31, 2017, pp. 1-3.

"TS 23.502: Update SMS over NAS Procedures", SA WG2 Meeting #120, S2-172075, Agenda : 6.5.8, Huawei, Mar. 27-31, 2017, pp. 1-3.

"3rd Generation Partnership Project; Technical Specification Group Services and System Aspects; System Architecture for the 5G System; Stage 2 (Release 15)", 3GPP TS 23.501, V0.4.0, Apr. 2017, pp. 1-124.

International Search Report and Written Opinion received for corresponding Patent Cooperation Treaty Application No. PCT/US2017/031618, dated Nov. 30, 2017, 15 pages.

"3rd Generation Partnership Project; Technical Specification Group Services and System Aspects; 3GPP system to Wireless Local Area Network (WLAN) interworking; System description (Release 7)", 3GPP TS 23.234, V7.2.0, Jun. 2006, pp. 1-88.

"Network-initiated Service Request for Non-3GPP Access", SA WG2 Meeting #120, S2-172036, Agenda : 6.5.10, Huawei, Mar. 27-31, 2017, pp. 1-4.

"TS 23.502: SMS over NAS Editorial Correction", SA WG2 Meeting #120, S2-172109, Agenda : 6.5.8, Nokia, Mar. 27-31, 2017, pp. 1-4.

Communication pursuant to Article 94(3) EPC dated Apr. 12, 2021 corresponding to European Patent Application No. 17724241.9.

* cited by examiner

SMS VIA NAS CARRIED BY NON-CELLULAR ACCESS

RELATED APPLICATION

This application was originally filed as PCT Application No. PCT/US2017/031618 filed May 8, 2017.

FIELD

The subject matter described herein relates to short message service (SMS).

BACKGROUND

More and more, the world has become increasingly connected. Users carry mobile devices, such cell phones, smart phones, and/or the like. In addition to the growing user base, the public land mobile network is increasingly being relied upon for Internet of Things (IoT) connectivity and the evolving autonomous driving infrastructure. To facilitate this interconnected wireless world, 5th Generation Mobile technology (5G) is being developed to deliver extreme broadband, provide other features such as provide ultra-robustness, provide low latency connectivity, and/or provide massive machine-to-machine connectivity for the Internet of Things (IoT) as well as the Internet enabled, programmable world.

SUMMARY

Methods and apparatus, including computer program products, are provided for services, such as SMS, location services, and/or the like over the NAS through a non-cellular access.

In some example embodiments, there may be provided a method that includes receiving, via a non-access stratum connection through a wireless local area network, a notification message; sending a service request message to request, via the non-access stratum connection through the wireless local area network, delivery of downlink data for a service; and receiving, via the non-access stratum connection through the wireless local area network, the downlink data for the service.

In some variations, one or more of the features disclosed herein including the following features can optionally be included in any feasible combination. The service may include a location service, wherein the notification message and the service request message correspond to the location service. The service may include a short message service and the downlink data includes a short message service message, wherein the notification message and the service request message correspond to the delivery of the short message service message. The notification message, the service request message, and/or the short message service message may be exchanged, via an N1 interface, with a core access and mobility management function node, wherein the N1 interface is accessed regardless of whether the N1 interface is accessed via the wireless local area network or a cellular network. The notification message may include an indication of the short message service message pending delivery, wherein the short message service message is a mobile-terminated short message service message. The notification message may be received in response to the apparatus being in an idle state with respect to the non-access stratum connection. There may be a fall back to the non-access stratum connection through the cellular network in response to not responding to the notification message. Policy information may be received from a network node, wherein the policy information may indicate how short message service message delivery is handled over the non-access stratum connection through the wireless local area network and through the cellular network.

In some example embodiments, there may be provided a method that includes determining whether to send downlink data for a service to a user equipment over a non-access stratum connection through a wireless local area network; sending, via the non-access stratum connection through the wireless local area network, a notification message to the user equipment, the notification message sent in response to the determination; receiving, from the user equipment, a service request message to request, via the non-access stratum connection through the wireless local area network, delivery of the downlink data for the service; and sending, via the non-access stratum connection through the wireless local area network, the downlink data to the user equipment.

In some variations, one or more of the features disclosed herein including the following features can optionally be included in any feasible combination. The service may include a location service, wherein the notification message and the service request message correspond to the location service. The service may include a short message service and the downlink data includes a short message service message, wherein the notification message and the service request message correspond to the delivery of the short message service message. The service request message, and/or the short message service message may be exchanged, via an N1 interface, with the user equipment, the N1 interface being accessed by the apparatus regardless of whether the N1 interface is accessed via the wireless local area network or a cellular network. The determining may be based on policy information. The notification message may be sent in response to a paging request being received. The notification message may include an indication of the short message service message pending delivery, wherein the short message service message is a mobile-terminated short message service message. The service request message may trigger a message to a network node including a short message service function, wherein the message requests delivery of the short message service message, wherein the apparatus is further caused to at least receive, from the network node, the short message service message including an indication of whether the short message service message is allowed to be carried over the non-access stratum connection through the wireless local area network to the user equipment. There may be a fall back to the non-access stratum connection through the cellular network in response to not receiving the notification message. Policy information may be sent to the user equipment, policy information indicating how the user equipment handles short message service message delivery over the non-access stratum connection through the wireless local area network and over non-access stratum connection through the cellular network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
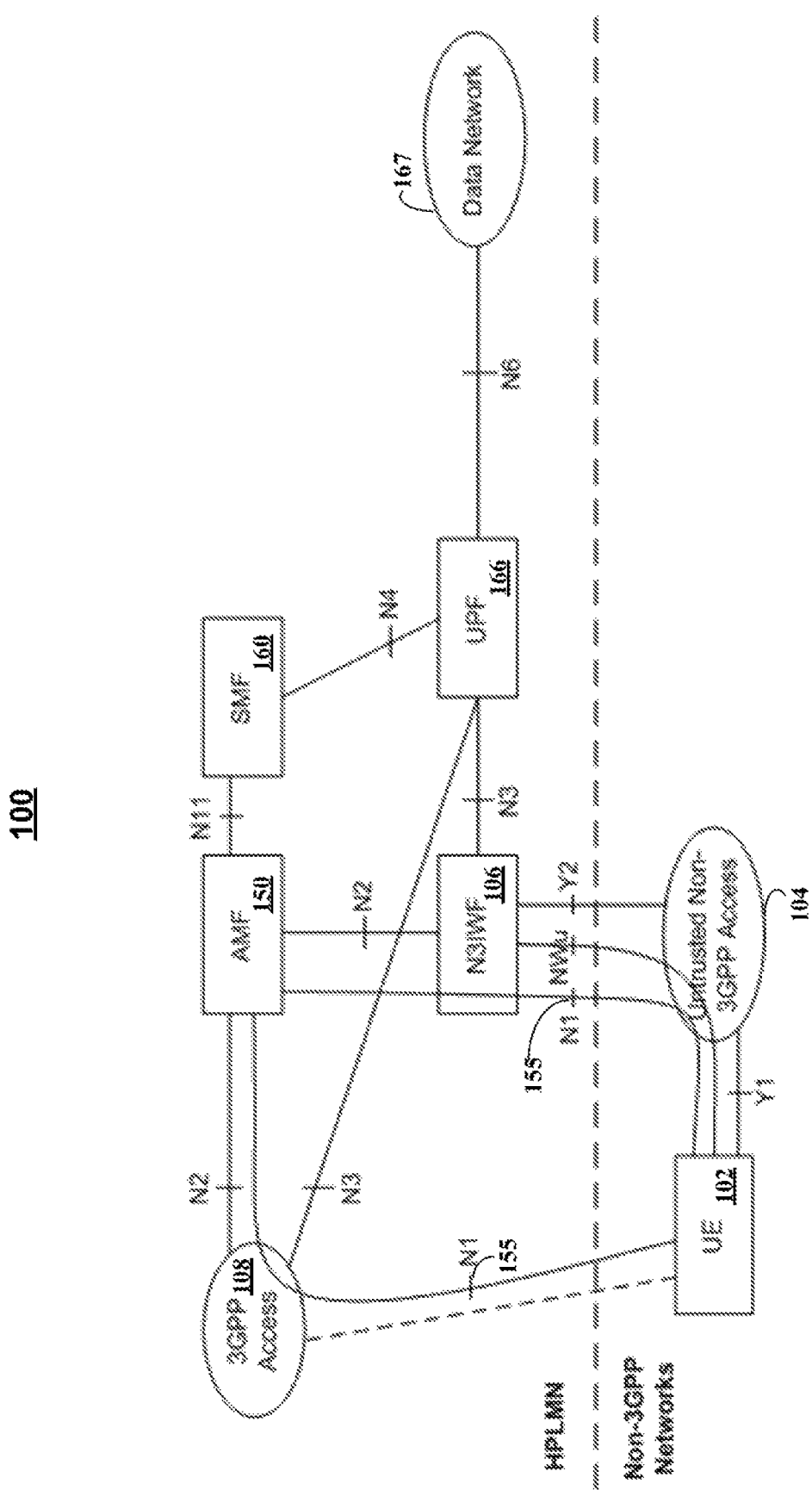
FIG. 1 depicts an example of a system, in accordance with some example embodiments.

Like labels are used to refer to same or similar items in the drawings.

DETAILED DESCRIPTION

In 5G, a harmonized network access stratum (NAS) protocol may be provided for both cellular access and non-cellular access (for example, non-$3^{rd}$ Generation Partnership Project (3GPP) access). The NAS is a functional layer between the core network and the user equipment, and the NAS provides communication session establishment, mobility management, and/or the like.

FIG. 1 depicts an example of a system 100, in accordance with some example embodiments, for non-GPP, such as non-cellular, access via for example a WiFi access point, although other types of non-cellular access technologies may be used as well. Some aspects of system 100 may be in accordance with 3GPP TS 23.501, V0.4.0 (2017-04), 3rd Generation Partnership Project; Technical Specification Group Services and System Aspects; System Architecture for the 5G System; Stage 2, Release 15 (hereinafter TS 23.501).

At FIG. 1, there is common reference point N1 (labeled 155) that is used for NAS signaling between the user equipment (UE) 102 and a network node, such as a Core Access and Mobility Management Function (AMF) node 150. This reference point N1 may be used for NAS regardless of whether the radio access is via cellular 108 (for example, a 3GPP cellular access via a cellular base station) or via non-cellular 104 (for example, a WiFi access point and/or the like). The common reference point N1 155 corresponds to a service interface (also reference to as an application interface), so that the UE 102 and AMF 150 use the same N1 reference point 155 when accessing the AMF via the 3GPP access point 108 (such as via a cellular base station) or via a non-3GPP access point 104 (such as via a WiFi access point). The reference point N1 may be in accordance with TS 23.501 as well as other standards.

In the example of FIG. 1, the UE 102 may access the AMF 150 via the non-3GPP access 104 and an interworking function 106 (labeled non-3GPP interworking function (N3IWF)), which provides an interworking function between the 3GPP cellular access and the non-3GPP access.

FIG. 1 depicts the non-3GPP access point 104 as a so-called "untrusted" access point. The non-3GPP access point 104 may be untrusted (for example, less trusted than the 3GPP access point 108) for a variety of reasons, such as lack of physical security of the access point 104, lack of control, and/or the like. Although FIG. 1 depicts the non-3GPP access point 104 as untrusted, the access point 104 may be trusted as well.

FIG. 1 also shows other reference points, N2, N11, N3, and N6, all of which may be in accordance with TS 23.501. Furthermore, FIG. 1 depicts additional components including a session management function (SMF) 160, a user plane function (UPF) 166, which may be coupled to a data network 167, such as the Internet or other type of network or link.

Figure 2:
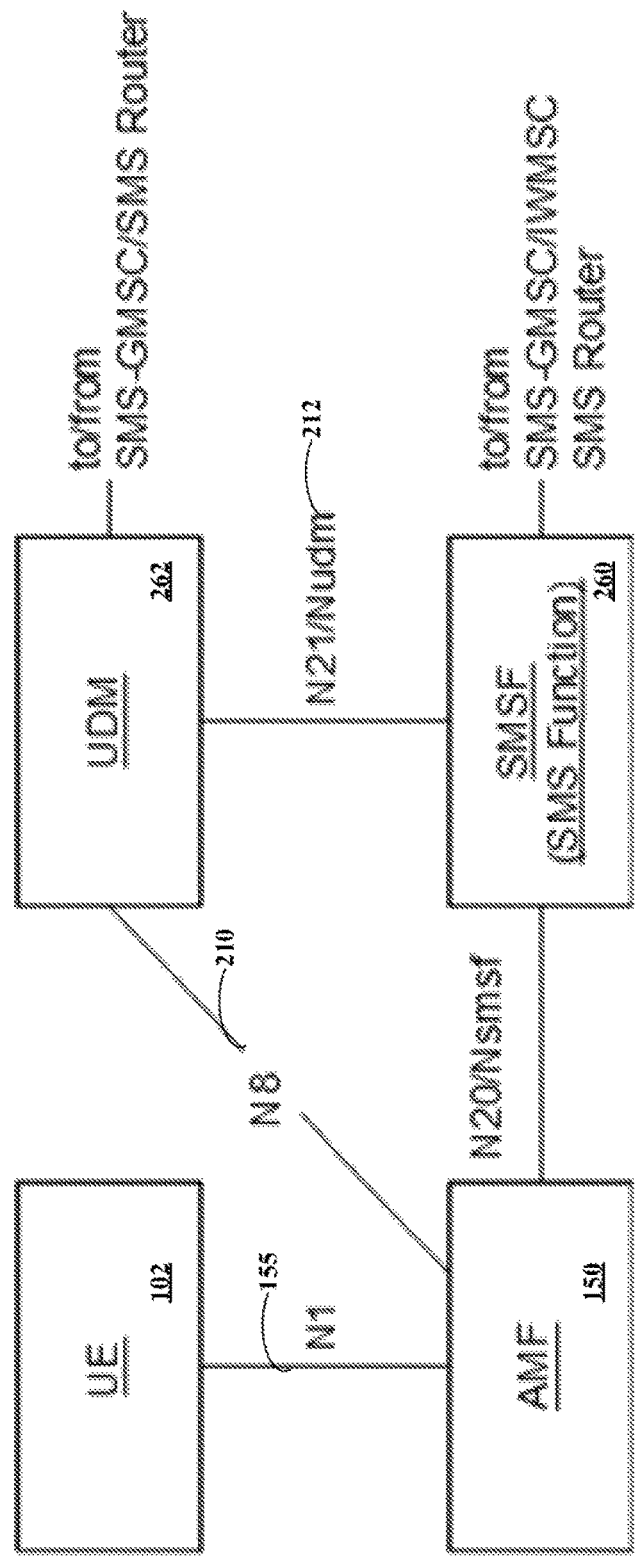
FIG. 2 depicts an example of a system, in accordance with some example embodiments.

FIG. 2 depicts an example of a system 200, in accordance with some example embodiments, for handling short messaging service (SMS) over the NAS. FIG. 2 depicts the UE 102, AMF 150, a short message service function (SMSF) node 260, a user data management (UDM) node 262, and corresponding reference points N1 155, N8 210, and N21 (or Nudm) 212, which is the service interface for the UDM. The UDM may be configured in accordance with TS 23.501 to provide processing of credentials, location management, subscription management, policy control, and/or storage of user subscription data (for example, subscription identifiers, security credentials, access, mobility related subscription data, and session related subscription data). Like FIG. 2, some aspects of system 200 may be in accordance with 3GPP TS 23.501, Release 15, April 2017). However, the current implementation of 3GPP TS 23.501 does not include SMS message handling to a UE connected via non-3GPP access over N1 interface. To that end, in some example embodiments, there may be provided SMS over NAS using a common, N1 reference point, so that the SMS access over the 3GPP access and the non-3GPP access are both over the NAS via the common reference point N1 between the UE and the AMF.

With respect to SMS, the SMS message may be a mobile originated (MO) SMS message or a mobile terminated (MT) SMS message. In the case of the MT-SMS, the AMF 150 may need to determine on which path, a non-3GPP access or a 3GPP access, to page (in the case of a cellular access) and/or notify (in the case of non-cellular access) the UE. Further, the AMF 150 may need to determine on which path to deliver to the UE the MT-SMS message. Moreover, the AMF 150 may need to determine how exactly to deliver the MT-SMS message via the non-3GPP access.

In the case of MT-SMS, the AMF 150 may have information that makes the AMF aware of whether a given UE is reachable via a 3GPP access. For example, the UE 102 may have registered over, for example, the 3GPP radio access network 108 and/or over the non-3GPP access network 104. Although, the AMF may not be aware of whether the UE 102 is, at any given time, actually reachable via the non-3GPP access. For example, when the UE is in connection management idle mode (CM-IDLE), the AMF may not have a NAS signaling connection to the UE, so the AMF may not be able to track the UE's mobility during this connection management idle period. To make matters worse, the UE may not provide any mobility registration updates or be responsive to paging procedures (while in a non-3GPP access), while in the connection management idle mode.

In some example embodiments, there may be provided a NAS level notification message to enable triggering the UE 102 to respond to the AMF 150 using a service request message sent over a non-3GPP access. The NAS level notification message may reach the UE while the UE is in a connection management connected state (for example, over a NAS signaling connection to the UE).

Figure 3:
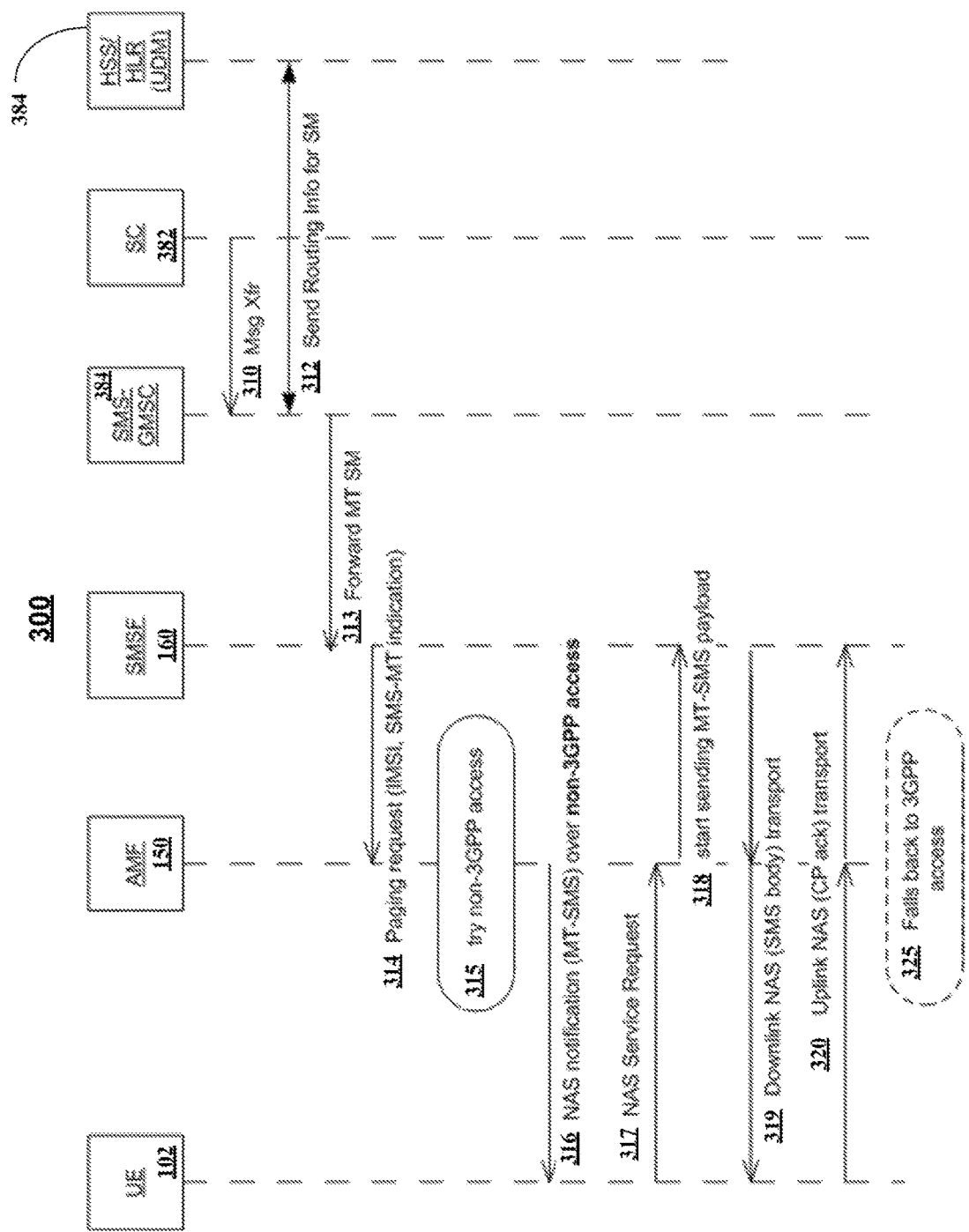
FIG. 3 depicts an example of a signaling diagram for mobile terminated SMS, in accordance with some example embodiments.

FIG. 3 depicts an example of a signaling diagram 300, in accordance with some example embodiments. The description of FIG. 3 also refers to FIGS. 1 and 2.

When an SMS message is sent by a subscriber, this short message may be routed to an SMS service center (SC) 382, which may be coupled to at least one SMS gateway mobile switching center (SMS-GMSC) 384. The SMS SC may be responsible for routing the SMS message to a terminating UE, such as UE 102.

When the SMS-SC 382 has an SMS message that needs to be sent to a terminating UE, the SMS SC 382 may send, at 310, the SMS message to the SMS-GMSC 384, in accordance with some example embodiments. In response, the SMS-GMSC 384 may contact, at 312, the terminating UE's home subscriber server/home location register (HSS/HLR) 386 to obtain the destination UE's current location as it may be mobile. The HSS/HLR may respond, at 312, with routing information, in accordance with some example embodiments. For example, the routing information may include an identity of a serving node currently serving the terminating UE, a serving mobile switching center address currently serving the terminating UE, and/or the like. With this routing information, the SMS-GMSC 384 may, at 313, forward the SMS message to the SMSF 160, in accordance with some example embodiments. In response to receiving the message at 313, the SMSF 160 may, at 314, send a paging request message to the AMF 150, in accordance with some example embodiments. This paging request may include an identifier of the terminating UE 102. The identifier may include the international mobile subscriber identity (IMSI) of the terminating UE and an indication (labeled "SMS-MT" at 314) that there is an SMS message pending delivery to the UE.

In accordance with some example embodiments, the AMF 150 may determine whether to deliver the SMS message (which is in this case an MT SMS message) over a non-cellular access, such as non-3GPP access 104. This determination may be based on policy, such as an operator's policy, user policy, and/or a combination of both. For example, a policy may be configured to try delivery via non-cellular access 104, such as a WiFi access point and/or the like, before trying a cellular access 108, such as a cellular base station and/or the like. Alternatively or additionally, a policy may be configured to attempt delivery of the MT-SMS message via the non-cellular access 104, in response to a determination that the UE 102 is in a connection management-connected state (CM-CONNECTED state with respect to NAS signaling) with the non-3GPP access 104, but in a connection management-idle state (CM-IDLE state with respect to NAS signaling) with the 3GPP access 108. Although certain examples of policies are described, other policies may be used as well. For example, a policy may be based on time of day or network traffic load so that a policy may be configured to try during certain times of day or under certain traffic loads delivery via non-cellular access 104 over the N1 interface before (or after) trying a cellular access 108.

In some example embodiments, the AMF 150 may send, at 316, a NAS notification message to the UE 102 over the determined access, such as the non-3GPP access 104 for example, and this notification message may indicate to the UE 102 a pending MT-SMS message. For example, the AMF 150 may send, via a WiFi access point, the NAS notification message to the UE 102, when the policy determines that non-3GPP access should be used. This notification message may be sent by accessing the N1 interface 155 between the AMF and UE. As discloses herein NAS notification message are NAS messages sent between an application interface at the AMF and an application interface at the UE. Moreover, the NAS notification may include a priority indicator (which may indicate the priority of the notification), the type of service triggering the notification message (for example, SMS or MT-SMS, location service, or any other service that has pending downlink data to be sent to UE), the type of access (for example, 3GPP access or non-3GPP access) which is to be used to respond, and/or the like. In some example embodiments, the UE 102 may respond, at 317, to the NAS notification message by sending, at 317, a NAS service request via the access in which it received the notification message (or page if sent via the cellular, 3GPP access point 108) of 316. The message may be sent via the N1 155 reference point, or interface. The service request message may be sent by the UE to request the establishment of a NAS signaling connection over the non-3GPP access 104. Moreover, the service request message may be in accordance with a standard, such as TS 23.501. Alternatively or additionally, the UE may respond with the NAS service request message via the 3GPP access network 108, which may serve as a mobile terminated SMS service request (since the UE is responding to the request 316 from network).

The service request message at 317 may trigger the AMF 150 to send, at 318, a message to the SMSF 160 to start sending the MT-SMS message payload towards the destination UE 102, in accordance with some example embodiments. At 319, the SMS payload may be carried via a downlink at 320 to the UE, which may trigger an acknowledgement at 320, in accordance with some example embodiments. This may trigger the MT-SMS delivery via the NAS to the UE.

In some example embodiments, the AMF 150 may fallback, at 325, from the non-3GPP access 104 to the 3GPP access 108 procedure to perform paging via the 3GPP access, in response to the AMF not receiving a NAS service request message from the UE 102 after a time period (for example, after a predetermined time configured via a timer).

In the case of 3GPP's LTE WLAN Aggregation (LWA) and/or 3GPP's LTE WLAN Radio Level Integration with IPsec Tunnel (LWIP), a radio access node (RAN) node may be configured to determine on which path (for example, a 3GPP access or a non-3GPP access) to transmit a user data packet, when the UE is in a radio resource control (RRC) connected state. With a common NAS N1 reference point, the radio access network (RAN) node may transmit a NAS packet (which may be received over the N2 reference point) over the non-3GPP access. If for some reason that RAN node needs to know which NAS packet can (or cannot be transferred) via the non-3GPP access, the AMF 150 may, in some example embodiments, include an indication in the NAS message. For example, when the downlink NAS transport message (which carries the SMS message) is sent, at 319, to the UE 102, this NAS message may include the indication to the RAN node that this NAS packet can be carried via the non-3GPP access. Likewise, if the indication is absent, the NAS message cannot be carried via the non-3GPP access.

In some example embodiments related to mobile-originated SMS, there may be provided a way to select NAS signaling via the 3GPP access or the non-3GPP access. To that end, the UE 102 may be provided with provisioning information. This provisioning information may provide policy to allow the UE 102 to select NAS via the 3GPP access 108 or the non-3GPP access 104. Moreover, this provisioning information may be provided in accordance with a standard, such as 3GPP TS 23.221 V14.1.0 (2016-12), 3rd Generation Partnership Project; Technical Specification Group Services and System Aspects; Architectural requirements, Release 14 (hereinafter TS 23.221).

Although FIG. 3 describes the service being delivered as SMS, other types of services may use the non-access stratum carried over the non-3GPP access as well. For example, the NAS notification message may notify, at 316, the UE 102 of another user service, such as a location service and/or the like, having data to be delivered to the UE (via the N1 and the non-access stratum carried over the non-3GPP access). When that is the case, the NAS notification message may include an indication for the service, such as an indication of the location service (for example, an "LS" for location service, rather than the SMS-MT indicator) and/or other service. In response, the UE may send, at 316, a NAS service request to request delivery of the service, such as location service and/or the like, and the service's data via the non-access stratum carried over the non-3GPP access.

Figure 4:
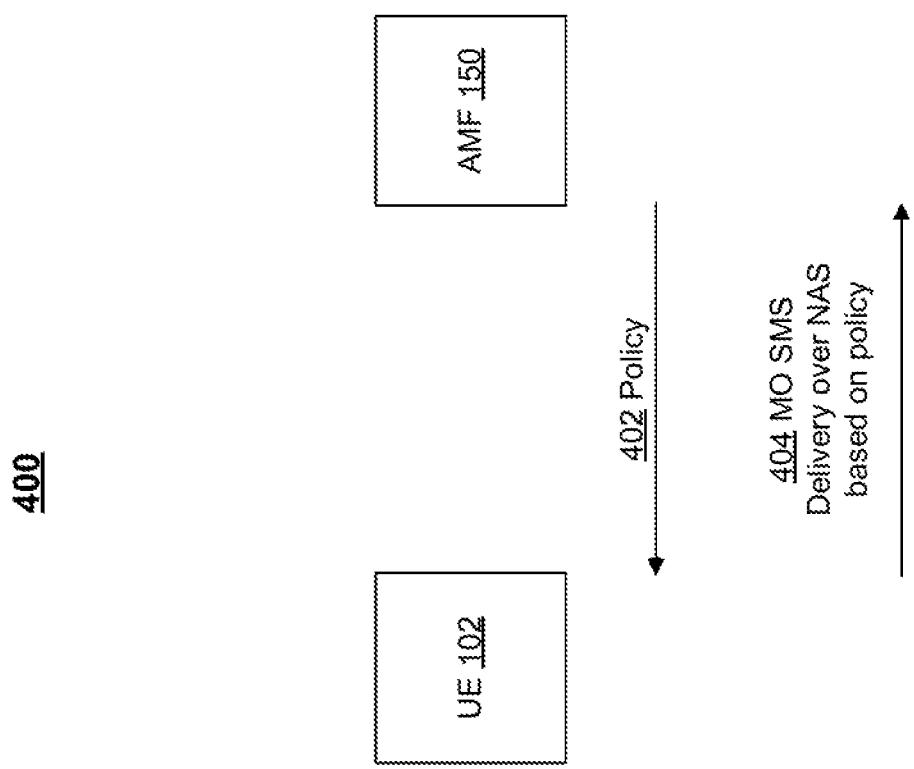
FIG. 4 depicts an example of a signaling diagram for mobile originated SMS, in accordance with some example embodiments.

FIG. 4 depicts a signaling diagram 400 for provisioning the UE 102, in accordance with some example embodiments.

A network node, such as the AMF 150, may provision, at 402, the UE 102 with one or more polices. For example, the UE may be provisioned with the network operator's preference indicating how an IMS enabled UE 102 is supposed to handle SMS services. This policy may indicate that the SMS is not to be invoked over IP networks, in which case the UE does not attempt to deliver SMS over IP networks. Instead, the UE attempts to deliver SMS over NAS signaling. Alternatively or additionally, the policy may indicate that SMS is preferred to be invoked over IP networks, in which case the UE attempts to deliver SMS over IP networks. If delivery of SMS over IP networks is not available, the UE may attempt to deliver SMS over NAS signaling. With the provisioned policy, the UE may deliver, at 404, mobile originated SMS messages in accordance with the policy.

Figure 5:
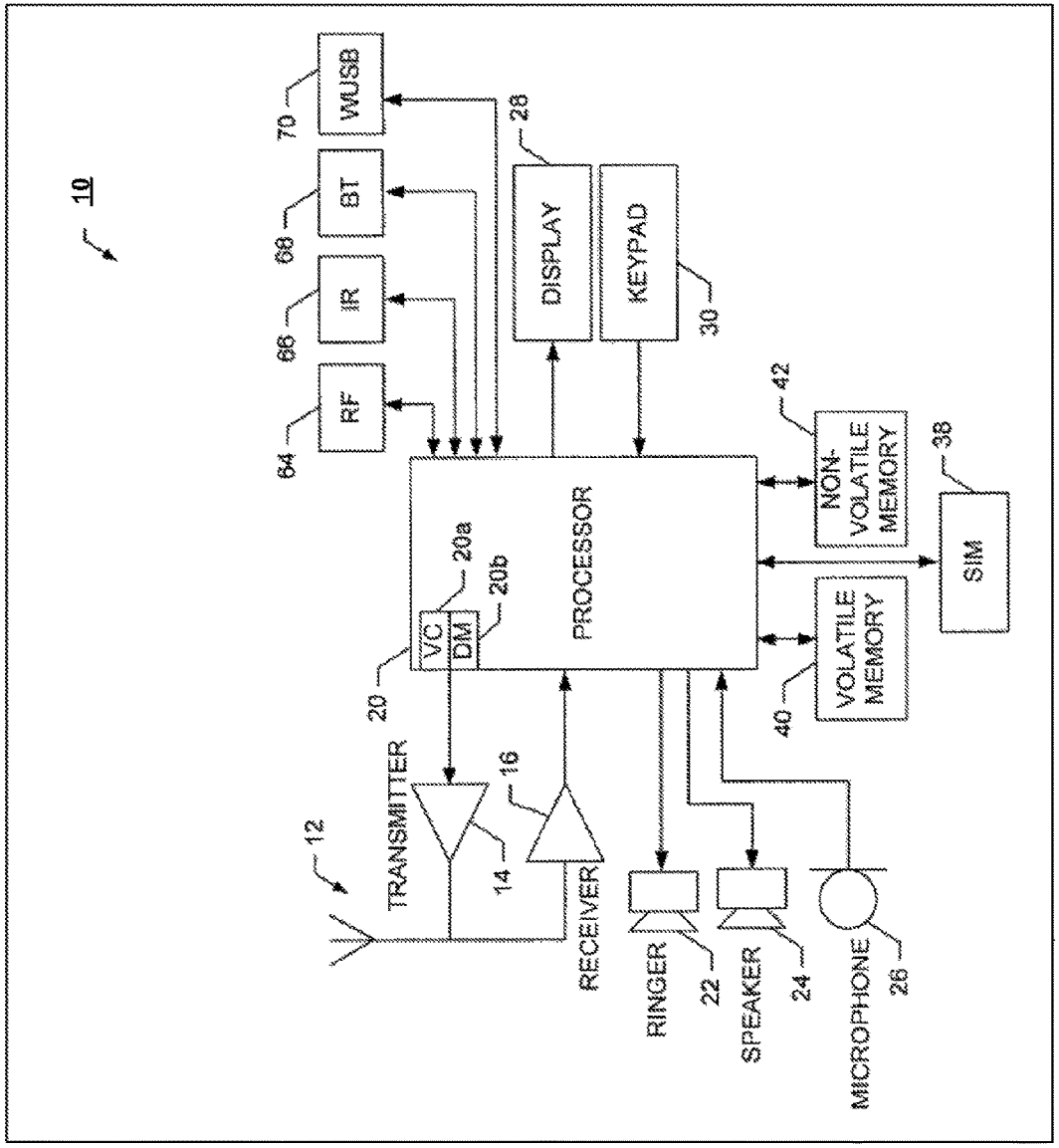
FIG. 5 depicts an example of an apparatus, in accordance with some example embodiments.

FIG. 5 illustrates a block diagram of an apparatus 10, in accordance with some example embodiments. The apparatus 10 may represent a user equipment, although portions of the apparatus 10 may be used to provide a base station, access point, network node, and/or the like. For example, a network node such as a base station or the like may include a wired and/or wireless network interface, at least one processor, and at least one memory including program code to provide the operations disclosed herein with respect to the network node, and the network node may be configured in accordance with the one or more standards noted herein.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, for example, process 300, 400, and/or other operations disclosed herein).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein supporting SMS over NAS via non-cellular such WiFi or other wireless local area network technologies.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, by a user equipment via a non-access stratum connection through a non-3GPP access network, a notification message sent by a core access and mobility management function node after establishment of the non-access stratum connection for a short message service, wherein the notification message indicates that a mobile terminated short message service message is pending for the short message service;
   sending, by the user equipment, a service request message to the core access and mobility management function node via the non-access stratum connection through the non-3GPP access network, to request delivery of the mobile-terminated short message service message; and
   receiving, by the user equipment via the non-access stratum connection through the non-3GPP access network, the mobile-terminated short message service message.

2. The method of claim 1, wherein the receiving comprises receiving, by the user equipment, a non-access stratum transport message which carries the mobile-terminated short message service message.

3. The method of claim 1, further comprising sending, by the user equipment, via the non-access stratum connection through the non-3GPP access, an acknowledgement indicating receipt of the mobile-terminated short message service message.

4. The method of claim 3, wherein at least one of the notification message is received, the service request message is sent, or the mobile terminated short message service message is received, via an N1 interface, and wherein the N1 interface is accessed via the non-3GPP access network.

5. The method of claim 3, wherein the notification message includes an indication of a type of access to be used to respond to the notification message, wherein the type of access is non-3GPP access.

6. The method of claim 1, wherein the notification message is received by the user equipment when the user equipment is in a connection management idle state.

7. The method of claim 1 further comprising receiving, by the user equipment, via the non-access stratum connection through the 3GPP access network a second notification message sent by the core access and mobility management function node, the second notification message indicating pending delivery of a second mobile-terminated short message service message, sending, by the user equipment, the non-access stratum connection through the 3GPP access network.

8. The method of claim 3, further comprising receiving, by the user equipment, from a network node, policy information indicating how the mobile-terminated short message service is handled when the mobile-terminated short message service message is received via the non-access stratum connection through the non-3GPP access network and when the mobile-terminated short message service message is received via the non-access stratum connection through the 3GPP access network.

9. A method comprising:
   determining to deliver a mobile-terminated short message service message to a user equipment over a non-access stratum connection through a non-3GPP access network;
   sending, by the core access and mobility management function node, via the non-access stratum connection through the non-3GPP access network, a notification message to the user equipment after establishment of the non-access stratum connection for a short message service, wherein the notification message indicates that the mobile-terminated short message service message is pending for the short message service;
   receiving, by the core access and mobility management function node, a service request message via the non-access stratum connection through the wireless local area network, to request delivery of the mobile-terminated short message service message; and
   sending, by the core access and mobility management function node via the non-access stratum connection through the non-3GPP access network, the mobile-terminated short message service message to the user equipment.

10. The method of claim 9, wherein the sending comprises sending, by the core access and mobility management function node, a non-access stratum transport message which carries the mobile-terminated short message service message.

11. The method of claim 10, wherein at least one of the notification message is sent, the service request message is received, or the mobile terminated short message service message is sent, via an N1 interface accessed via the non-3GPP network.

12. The method of claim 9, wherein the notification message is sent in response to receipt of a paging request.

13. The method of claim 10, wherein the notification message includes an indication of a type of access to be used to respond to the notification message, wherein the type of access is non-3GPP access.

14. The method of claim 10, wherein receipt of the service request message triggers sending, by the core access and mobility management function node, a message to a network node including a short message service function, wherein the message requests delivery of the mobile-terminated short message service message, wherein the method further comprises receiving, from the network node, the mobile-terminated short message service message including an indication of whether the mobile-terminated short message service message is allowed to be carried over the non-access stratum connection through the non-3GPP access network to the user equipment.

15. The method of claim 9 further comprising sending, by the core access and mobility management function node, the notification message via the non-access stratum connection through a 3GPP access network in response to not receiving the service request message within a predetermined time period.

16. The method of claim 9, further comprising sending, by the core access and mobility management function node to the user equipment, policy information indicating how the user equipment handles mobile terminated short message service message when the user equipment receives the mobile-terminated short message service message via the non-access stratum connection through the non-3GPP access network and when the user equipment receives the mobile-terminated short message service message via non-access stratum connection through the 3GPP access network.

17. An apparatus comprising:
at least one processor; and
at least one memory including program code which when executed causes the apparatus to at least:
receive, via a non-access stratum connection through a non-3GPP network, a notification message sent by a core access and mobility management function node after establishment of the non-access stratum connection for a short message service, wherein the notification message indicates that a mobile terminated short message service message is pending the short message service;
send a service request message to a core access and mobility management function node, via the non-access stratum connection through the non-3GPP access network, to request delivery of the downlink data for the mobile terminated short message service message; and
receive, via the non-access stratum connection through the non-3GPP access network, the mobile-terminated short message service message.

18. The apparatus of claim 17, wherein the at least one memory including program code which when executed further causes the apparatus to receive, via the non-access stratum connection through the non-3GPP access, the mobile-terminated short message service message by receiving a non-access stratum transport message which carries the mobile-terminated short message service message.

19. The apparatus of claim 17, wherein the notification message includes an indication of a type of access to be used to respond to the notification message, wherein the type of access is non-3GPP access.

20. The apparatus of 17, wherein at least one of the notification message is received, the service request message is sent, or the mobile-terminated short message service message is received via an N1 interface accessed via the non-3GPP access network.

* * * * *